D. G. Wells,
Forming Bats.

No. 15715 Patented Sep. 9, 1856.

UNITED STATES PATENT OFFICE.

D. G. WELLS, OF NEW YORK, N. Y.

MACHINERY FOR FORMING HAT-BODIES.

Specification of Letters Patent No. 15,715, dated September 9, 1856.

*To all whom it may concern:*

Be it known that I, D. G. WELLS, of the city, county, and State of New York, have invented a new and useful Improvement in Machines for Forming Hat-Bodies; and I do hereby declare that the following is a full and exact description of the construction and operation of the same in all its essential parts.

The nature of my invention consists in so constructing a machine that the fur or other material used in forming hat bodies being placed upon an ordinary endless apron is carried to the feed rollers and is taken by them into the machine when it is separated and prepared by a picking cylinder and then by means of a peculiar combination of the currents of air from the picking cylinder with those from a fan blower the fur is carried away and distributed upon a perforated and exhausted core or former.

In order to explain my improvement more fully reference is had to the annexed drawings forming part of this specification in which—

Figure 1:
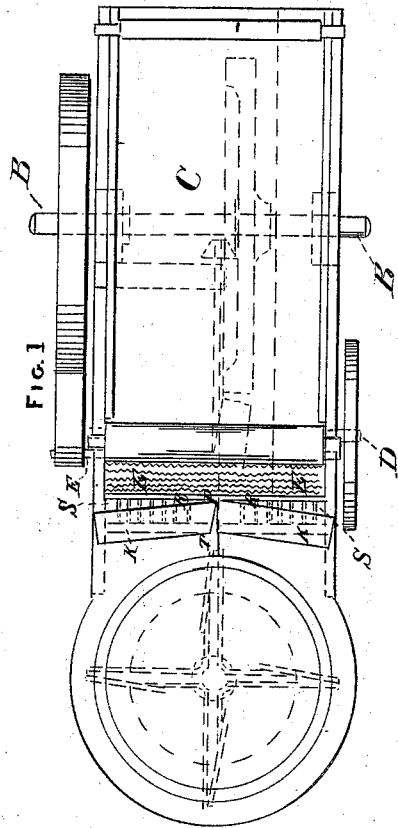
Figure 2:
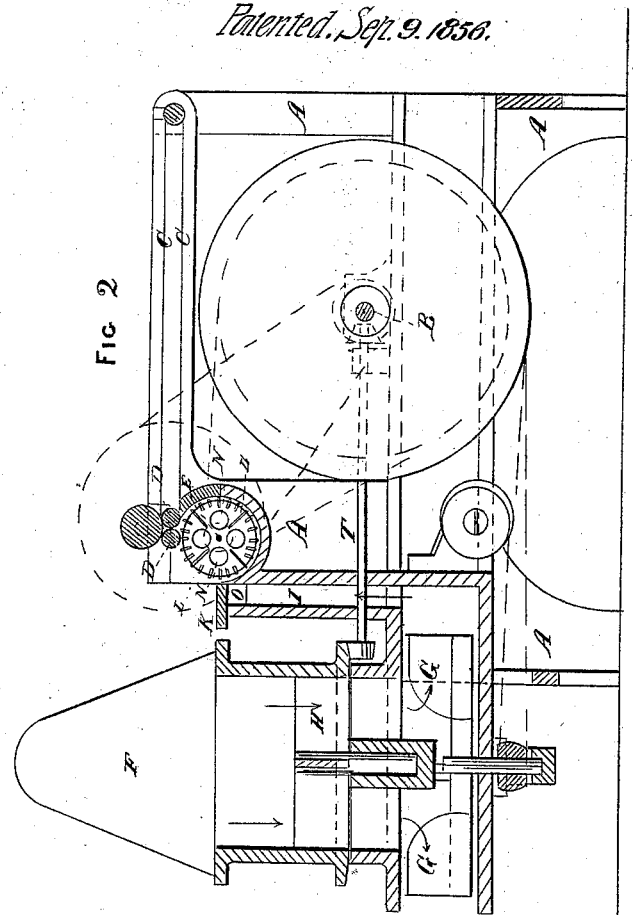
Figure 3:
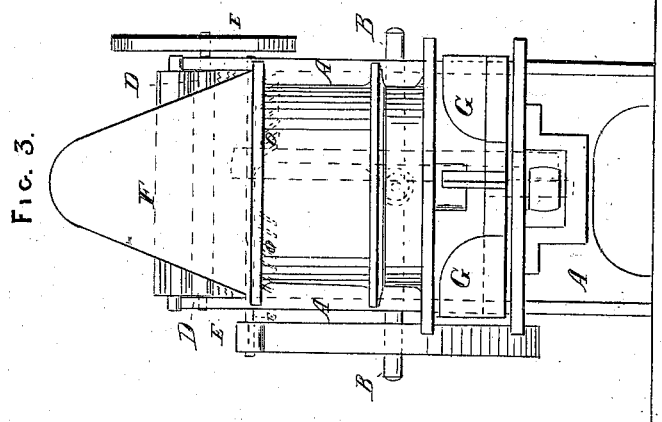

Figure 1 is a plan of the machine, Fig. 2 is a vertical section, and Fig. 3, is an end view, of the same, like letters referring to like parts.

A, A, is the frame of the machine, B, is the main shaft, C, is the endless apron which receives the fur and carries it to the feed rollers D, D, and passing between these rollers it comes in contact with the picking cylinder E, and thence it is thrown off toward the perforated cone or former F, which revolves on its vertical axis by a motion transmitted to it through the shaft T. The rotary picker E is furnished with serrated fans L, L, which serve the double purpose of picking and separating the fur and then blowing it off toward the former F. The air enters this picking cylinder at each end through the apertures N, N, and passing out between the fans L, L, is thrown off at its periphery carrying with it the fur as it comes from the feed rollers D, D. The cone F, is exhausted by means of the fan blower G, which draws the air down through the passage H, and throws it off as indicated by the arrows.

In distributing the fur upon the cone it is desirable to give every part of its surface a definite portion of fur, and since the direction of the fur is controlled by the currents of air in which it floats, the proper distribution can be effected by controlling the currents of air from the picking cylinder in such a manner that while a portion of those currents strike the tip of the cone another portion will fall at the base and other portions upon every intermediate space between the tip and base. Now to control these currents in this manner I make use of secondary currents of air which come up from the blower G, through the air passage I, and pass the regulating valves K, when it comes in contact with the currents from the picker and by means of the combination of these currents as hereafter shown the fur is carried to any part of the cone as desired. The partitions O, O, serve to incline the current toward the center so as to bring them within the range of the cone.

The valves K, K, cover the entire length of the air passage I, and are adjusted so as to form the wedge shaped apertures P, R, S. At P, the aperture is so narrow that the secondary current comes up there with very little force and the current from the picking cylinder being but slightly affected by it passes along over it with the fur to the base of the cone. At R, the aperture is wider and admits a stronger upward current which carries the fur higher up on the cone, and at S, which is the widest part, the upward current is so strong that it carries the fur to the top of the cone, and thus all the intermediate parts of the apertures are so adjusted as to carry the fur to all the intermediate parts of the cone.

When the valves K, are once properly adjusted for the formation of a bat they require no further change unless for a bat of different dimensions or proportions. But in some machines heretofore devised constant changes are required even in the formation of a single bat. See D. Barnum patent Oct. 17, 1854, in which case more time must necessarily be required in the formation of a bat than by the process herein described, since the fur is deposited upon only a small portion of the surface of the cone at the same time. While in my machine it is carried to every part of its surface at every revolution of the same.

I wish to have it understood that I do not claim the use of the secondary currents of air nor valves to control them, but What I do claim, and desire to secure by Letters Patent is—

1. I claim the mode of guiding the currents of air from the picking cylinder in their passage to the cone substantially as herein described.

2. I claim the mode of regulating the secondary currents of air by means of the wedge shaped apertures formed by the valves K, K, substantially as set forth.

D. G. WELLS.

Witnesses:
 JNO. S. HOLLINGSHEAD,
 JOHN H. WISE.